CROSS REFERENCE SEARCH ROO 313-428. XR 3,377,512 SR

April 9, 1968 J. W. McLEOD, JR 3,377,512

UNITARY BEAM CONVERGENCE MAGNET STRUCTURE AND CONTROL APPARATUS

Filed Aug. 18, 1965 2 Sheets-Sheet 1

Tx 632
x 6329

INVENTOR.
JAMES W. McLEOD, JR.
BY
[signature]
Attorney

UNITARY BEAM CONVERGENCE MAGNET STRUCTURE AND CONTROL APPARATUS

INVENTOR.
JAMES W. McLEOD, JR.
BY
W. A. Sprague
Attorney

United States Patent Office 3,377,512
Patented Apr. 9, 1968

3,377,512
UNITARY BEAM CONVERGENCE MAGNET STRUCTURE AND CONTROL APPARATUS

James W. McLeod, Jr., Indianapolis, Ind., assignor to Radio Corporation of America, a corporation of Delaware Filed Aug. 18, 1965, Ser. No. 480,550
8 Claims. (Cl. 317—101)

ABSTRACT OF THE DISCLOSURE

An insulating panel on one side of which the convergence circuit controls are mounted also supports, on the same side, the convergence magnet structure in a resilient manner such that, when the panel which is provided with a central opening is mounted on the picture tube neck, the magnet core elements are urged into firm contact with the tube neck in alignment with the internal pole pieces. All interconnections between the electromagnets and the control elements are made by printed circuits on the other side of the panel.

This invention relates to magnetic apparatus for controlling the convergence of a plurality of electron beams and has particular reference to the mounting of such apparatus and of a control panel therefor.

Color television receivers and studio type monitors using a three-beam shadow mask type of color reproducing device require apparatus by which to converge the electron beams at all points of the viewing screen scanned by the beams. Such apparatus usually consists of a device or devices for effecting static convergence of the beams at some reference point such as at the center of the screen. Additionally, the convergence apparatus includes electromagnets by which to dynamically control the convergence of the electron beams over the entire screen. Such dynamic convergence apparatus is energized by waves varying as a function of the deflection angle of the electron beams.

It has been customary in most color television image reproducing apparatus to mount the convergence magnet structure at a suitable point along the neck of the picture tube so as to influence the electron beams before they are deflected to scan the usual raster. The control panel by which the waves applied to the respective magnetic structures are suitably adjusted has, in most cases, been located on a separate control panel. The necessary circuit connections between the convergence electromagnet apparatus and the control panel has required a considerable number of manual operations including soldering the connections and forming interconnecting cables, for example, even in instances where the various control elements are interconnected on their supporting panel by means of printed wiring techniques. Additionally, the mounting for the electromagnetic convergence apparatus should be of such a character that the core elements of the electromagnets are urged into firm contact with the glass of the picture tube neck so as to minimize the non-magnetic gaps between the core elements and the co-operating pole pieces mounted internally of the tube. In the past, such mounting structures have been relatively complex and somewhat costly with the result that the provision of the convergence apparatus has been made at considerable expense.

It, therefore, is an object of the present invention to provide a combined convergence magnet mounting and control panel of a character to minimize the manufacturing and assembly costs of such apparatus and to save space in the television receiver cabinet.

In accordance with the present invention, an insulating panel on which the convergence controls are mounted, also serves to support the convergence magnet structure. The magnet structure is mounted on such a panel in a resilient manner so that, when the panel which is provided with a central opening, is mounted on the picture tube neck, the magnetic core elements are urged into firm contact with the neck of the tube. The convergence electromagnets and all of the circuit components and adjustable control elements are mounted on one side of the insulating panel. All of the interconnections between the electromagnets and the control circuit elements are made by printed circuit facilities on the other side of the insulating panel. By means of apparatus, such as that embodying the present invention, a materially less expensive mounting for the magnetic structure is provided. None of the interconnections between the electromagnets and the control circuit components require manual operations and the combined structure is compact and therefore saves considerable space.

For a better understanding of the invention, reference now will be made to the following description, which is taken in conjunction with the accompanying drawings in which.

Figures 5, 6:
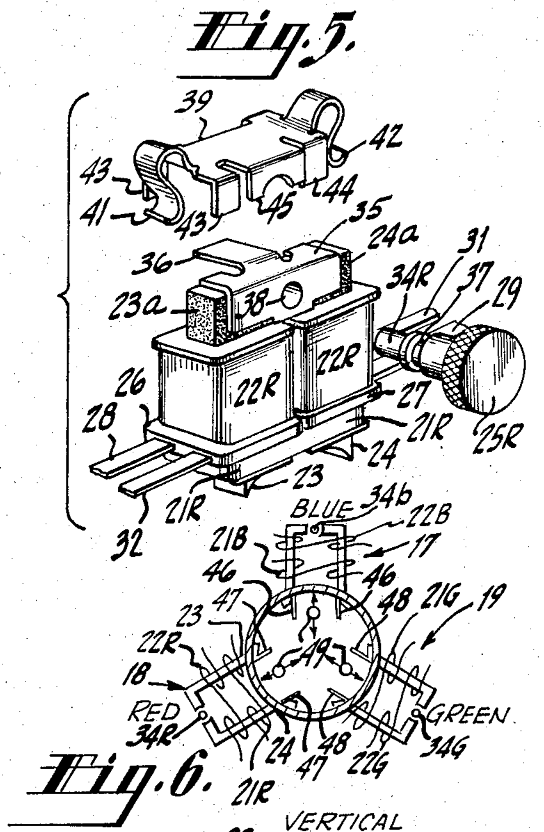
FIGURE 5 is an exploded view of one of the convergence electromagnets showing the manner in which the various component parts thereof are assembled and also illustrating another part of the novel mounting means for the electromagnet.

FIGURE 6 is a fragmentary sectional view of the neck of the color picture tube showing diagramatically the relationship of the convergence electromagnets, the internal pole pieces associated therewith, and the electron beams; and FIGURE 7a is a circuit diagram showing the interconnections between the various circuit elements and the convergence electromagnets and the means by which they are energized from the deflection circuits of the receiver.

Figures 1, 3:
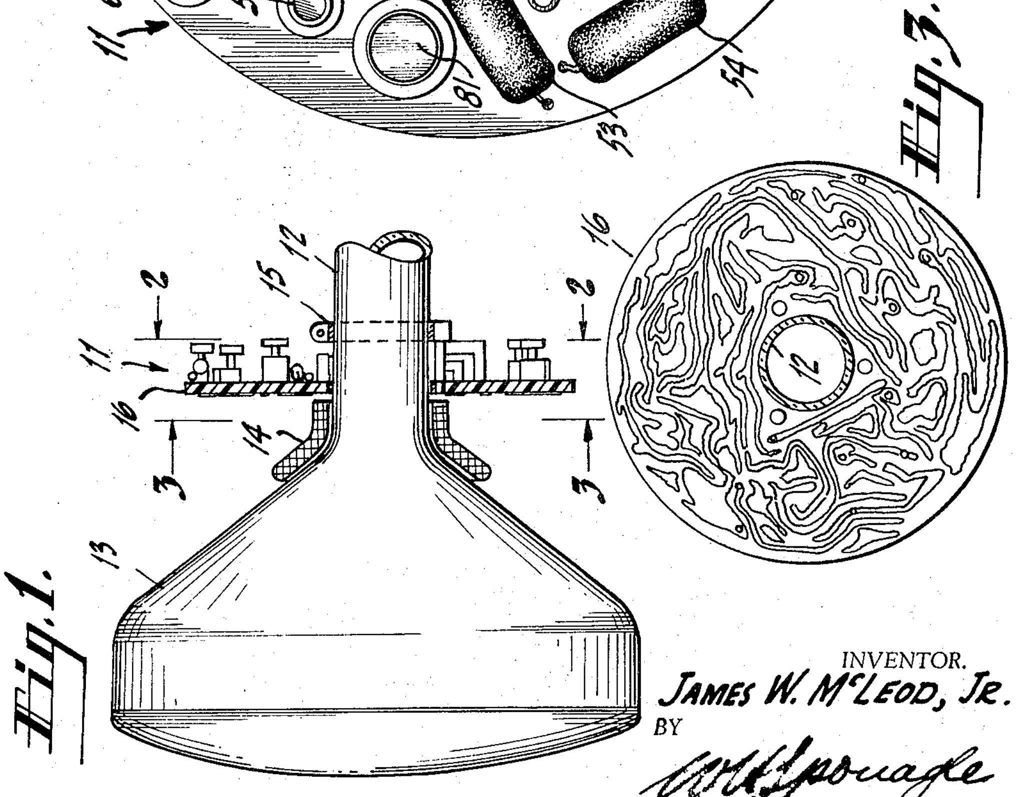
FIGURE 1 is a fragmentary side view of a color picture tube showing the general location of the combined magnet mounting and control panel embodying the invention.
FIGURE 3 is a sectional view taken on the line 3—3 of FIGURE 1 indicating the general configuration of the printed circuit connections between the convergence apparatus and circuit elements shown in FIGURE 2.

In FIGURE 1, the combined convergence magnet assembly and control panel 11 is mounted on the neck 12 of a three beam shadow mask color picture tube 13 at a point immediately to the rear of the beam deflection yoke 14. The convergence device 11 is secured in its illustrated position by means of a clamp 15 encircling the neck 12 of the picture tube. It will be understood that the picture tube is also provided with other beam controlling facilities such as a purity magnet and a lateral magnet as is customary.

Figure 2:
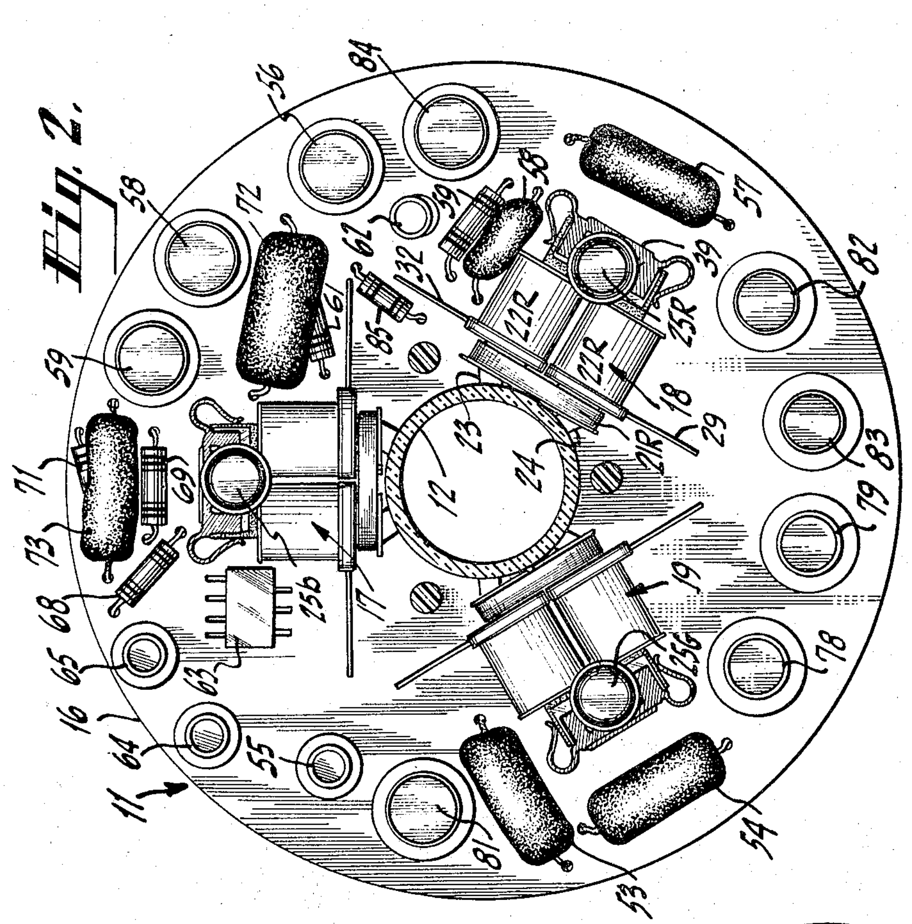
FIGURE 2 is an enlarged sectional view taken on the line 2—2 of FIGURE 1 showing the location of the convergence magnets and control circuit elements on one side of the mounting panel.

In FIGURE 2, the various circuit components and controls are shown in their positions at the rear side of the convergence device together with the beam convergence magnets in their respective positions around the neck 12 of the color picture tube. All of these components are mounted on an insulated board 16 and are affixed thereto by being soldered to the printed wiring on the front side of the board substantially as shown in FIGURE 3. As seen from the rear of the picture tube, the blue convergence magnet 17 is mounted at a vertical position at the top of the tube neck 12. The red and green convergence magnets 18 and 19 respectively, are mounted in positions which are radially displaced from the blue magnet 17 by approximately 120°. As in other forms of previously used convergence magnets, the present ones include a horizontal frequency coil structure including two substantially identical windings and a vertical frequency coil structure including two substantially identical windings surrounding two legs of a core structure preferably formed of ferrite material. For example, the red convergence magnet 18, comprises a horizontal coil structure 21R, and a vertical coil structure 22R, surrounding respectively, core legs 23 and 24. Each convergence magnet, such as the red convergence magnet 18, also includes a permanent magnet of cylindrical shape inserted between the two core legs 23 and 24, and which is adjustable by means of a knob 25R. Such a structure forms no part of the present invention, but is illustrated in greater detail in FIGURES 4 and 5, which will subsequently be described. Such a magnet structure is disclosed in greater detail in Patent No. 3,002,120 issued to Burton R. Clay on Sept. 26, 1961. Also shown in FIGURE 2, are the other circuit elements for controlling the currents and their waveforms as impressed upon the three convergence magnets 17, 18 and 19. These components will be identified and discussed briefly in connection with the description of FIGURE 7.

Figure 4:
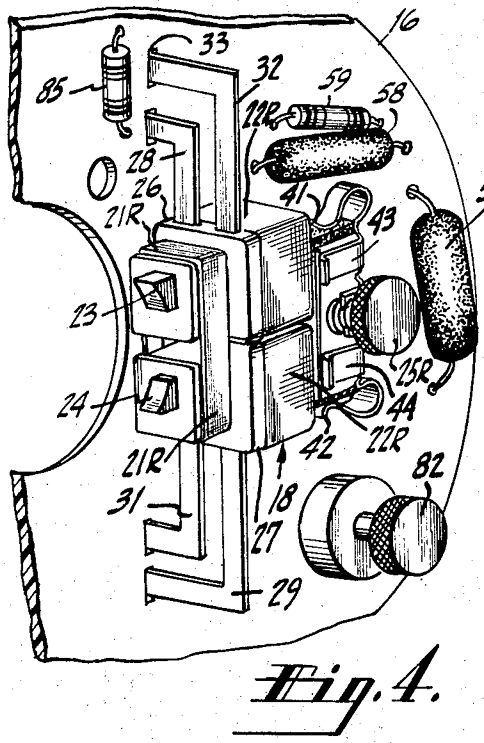
FIGURE 4 is a fragmentary view of the combined magnet mounting and control panel showing in perspective one of the convergence magnets and illustrating a part of the novel mounting means therefor in accordance with the present invention.

A more detailed illustration of the convergence magnet structure and its novel mounting in accordance with this invention, may be obtained by reference to FIGURES 4 and 5 which, for example, show the red magnet 18. The horizontal coil 21R and the vertical coil 22R are formed in two windings on a pair of bobbins 26 and 27. The core legs 23 and 24, extend through these bobbins. The two windings of the horizontal coil 21R are connected in series and terminated in conductive strips 28 and 29. Similarly, the two windings of the vertical coil 22R are connected in series and terminated in conductive strips 31 and 32. These conductive strips 28, 29, 31 and 32 are formed of relatively thin resilient material such as Phosphor bronze, for example, and are inserted in openings such as the slot 33 associated with strip 29, so that they extend through the insulating board 16 to the wiring side where they are both mechanically and electrically secured to the printed wiring by means such as solder. The strips, thus, serve as partial support for the convergence magnet 18.

The remaining support for this magnet is better illustrated in FIGURE 5. The upper ends, 23a and 24a of the core legs 23 and 24 respectively, are shaped to approach one another, ending with arcuate faces (see Clay Patent 3,002,120) in which to receive the cylindrical permanent magnet 34R. A retaining means comprising a strap 35, formed with a projection 36 at the top thereof, is placed around the internal facing portions of the core legs. This strap also has another extending portion (not shown) similar to the extension 36, but running at the lower edge of the facing portions of the core legs. The extension 36 extends through an opening (not shown) in the insulating board 16 and is mechanically affixed to the board by solder, for example. The strap 35 and its projections including the extension 36, also is made of resilient material such as Phosphor bronze which, in combination with the previously described strips 28, 29, 31 and 32, provides a mechanically secure mounting for the electromagnet 18 and yet, at the same time will permit the magnet structure to be moved radially from the longitudinal axis of the picture tube during installation of the structure on the neck of this tube and, being of resilient material, will urge the entire magnet structure toward the longitudinal axis so that the ends of the core legs 23 and 24 are maintained in firm contact with the outside of the picture tube neck.

The permanent magnet 34R is mounted on a structure which includes an annular recess 37 and the previously described adjusting knob 25R. The magnet 34R is inserted in an opening 38 provided in the strap 35 in line with the opening between the arcuate faces of the core legs 23a and 24a. The core leg upper ends 23a and 24a are urged toward one another by a clip 39. The clip is provided with a pair of clamping members 41 and 42 at opposite ends thereof which, when in position, urge the core leg ends 23a and 24a toward one another so that the opposing arcuate faces thereof, are brought into contact with the cylindrical surface of the permanent magnet 34. Two pairs of legs, 43 and 44, serve to hold the magnet assembly together in its other dimension. The clip 39 also is provided with a collar 45, which is received in the annular recess 37 of the permanent magnet structure, thereby retaining it in the assembly, but yet allowing it to be rotated under the control of the adjusting knob 25R so as to enable the necessary static convergence adjustment of the electron beams.

FIGURE 6 shows diagrammatically (as seen from the screen end of the tube 13) the relationship of the convergence electromagnets 17, 18 and 19, the internal pole pieces 46, 47 and 48 and the three electron beams 49. The pole pieces effectively are extensions of the legs of the electromagnet cores so that appropriate fields are produced between the pole pieces to move the beams in the directions indicated by the arrows so as to produce the desired beam convergence at the viewing screen. Static convergence of the undeflected beams at the center of the screen is effected by means including the permanent magnets 34B, 34R and 34G. Dynamic convergence of the beams over the entire screen is effected under the control of electromagnets 17, 18 and 19. To this end the horizontal coils 21B, 21R and 21G are energized by current waves each of which is essentially parabolic with a sawtooth component at the horizontal deflection rate. Similarly the vertical coils 22B, 22R and 22G are energized by essentially parabolic current waves with sawtooth components at the vertical deflection rate.

Figure 7:
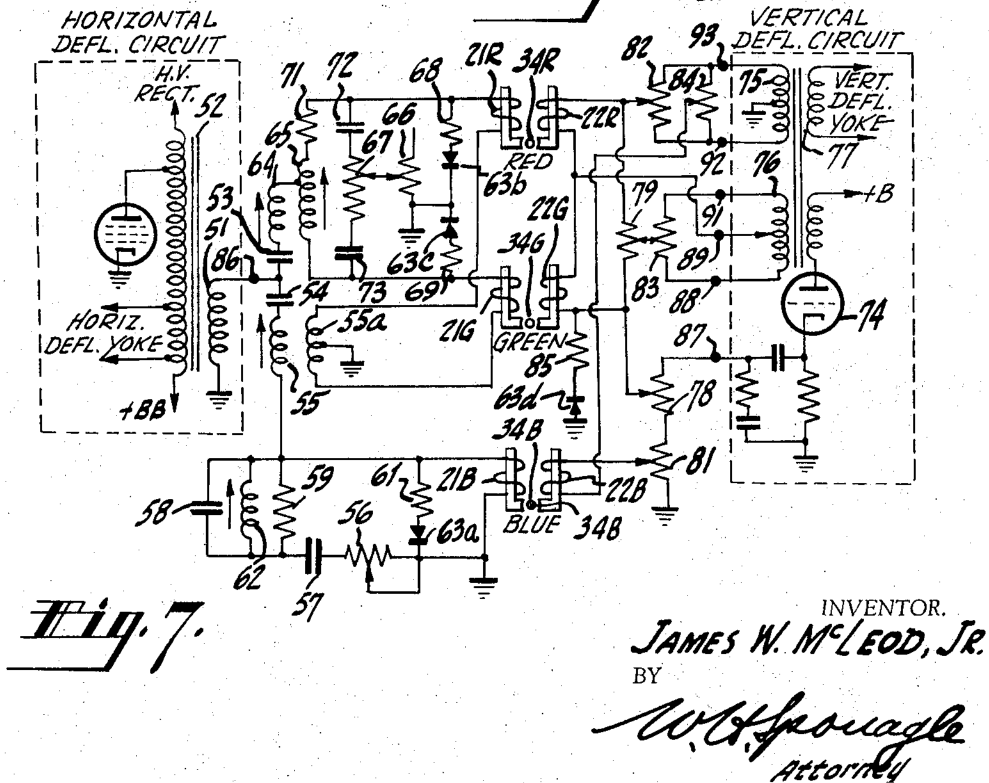

The wave-shaping and control circuits for energizing the convergence electromagnets are shown in FIGURE 7 and are substantially the same as those disclosed in U.S. Patent No. 3,163,797 granted Dec. 29, 1964 to George W. Singleback to which reference may be had for a detailed description of their operation. For present purposes, however, the various circuit elements will merely be identified so that they may be correlated with the physical layout of FIGURE 2 and a brief description will be given of the manipulations of the control elements to achieve the desired beam convergence.

Pulses at the horizontal deflection rate are derived from a secondary winding 51 of the horizontal output transformer 52 and impressed by coupling capacitors 53 and 54 upon the red-green and blue convergence apparatus. Adjustable coil 55 controls the amplitude of the horizontal parabolic current wave applied to the blue electromagnet coil 21B. A potentiometer 56 controls the sawtooth current component applied to the coil 21B at the horizontal deflection rate. Capacitors 57 and 58, resistors 59 and 61, coil 62 and diode 63a perform wave shaping functions.

Adjustable coil 64 controls the amplitude of the horizontal parabolic current wave applied to the red and green electromagnet coils 21R and 21G. Adjustable coil 65 controls the division of the horizontal parabolic wave between the coils 21R and 21G. Fixed coil 55a, inductively coupled to the adjustable coil 55, but substantially unaffected by the adjustment thereof, applies a sawtooth current component at the horizontal deflection rate to the red and green electromagnet coils 21R and 21G. Amplitude of the horizontal sawtooth wave applied to the red and green coils 21R and 21G is controlled by the potentiometer 66 and the division of this wave between the coils is controlled by the potentiometer 67. Resistors 68 and 69 and diodes 63b and 63c perform wave shaping functions. Current limiting resistor 71, and blocking capacitors 72 and 73 complete the circuits for horizontal deflection rate energization of the red and green electromagnet coils 21R and 21G.

The wave developed at the cathode of the vertical output tube 74 and the pulses produced in the secondary windings 75 and 76 of the vertical output transformer 77 are used to to energize electromagnet coils 22R, 22G and 22B. Amplitude of the vertical parabolic wave applied to the red and green electromagnet coils 22R and 22G is controlled by the potentiometer 78. Potentiometer 79 controls the proportioning of the wave between the coils 22R and 22G. The potentiometer 81 adjusts the amplitude of the vertical parabolic wave applied to the blue electromagnet coil 22B. Amplitude of the vertical sawtooth wave component applied to the red and green electromagnet coils 22R and 22G is controlled by the potentiometer 82 and the division of such wave between the two coils is controlled by the potentiometer 83. Amplitude of the vertical sawtooth wave component applied to the blue electromagnet coil 22B is controlled by the potentiometer 84. A resistor 85 and a diode 63*d* provide some additional wave shaping.

All of the circuit elements, except those included in the horizontal and vertical deflection circuits, are shown in FIGURE 2 mounted on the rear side of the convergence magnet board 16. It is to be understood that the coil 55 shown in this figure also includes the coil 55*a* which is inductively coupled thereto. Also, the four diodes, 63*a*, 63*b*, 63*c* and 63*d* of FIGURE 7 are encapsulated in a single block 63 of FIGURE 2.

FIGURE 7 shows a single terminal 86 for connection to the horizontal deflection circuit and six terminals 87, 88, 89, 91, 92 and 93 for connection to the vertical deflection circuit. All of the ground connections are combined and brought to another terminal (not shown). By using the structure of this invention, it only is necessary to manually make connections to these eight terminals. The additional twelve connections to the six convergence magnet coils, previously also made manually, are part of the printed circuitry of the structure embodying this invention. Thus, not only has the convergence apparatus been simplified, but its fabricating cost has also been materially reduced without in any way, impairing its effectiveness. The unitary structure has provisions for adjusting all of the circuit parameters as in previously employed arrangements. Following is a description of a typical convergence adjustment procedure.

Beam convergence adjustments may best be made with the aid of special test apparatus such as an RCA WR-61A color bar generator adjusted to display a cross-hatch of spaced vertical and horizontal bars on the luminescent screen of the color kinescope. Each bar of such a pattern consists of green, red and blue lines. When the three beams are properly converged both statically and dynamically in all areas of the screen, all bars of the pattern are white. When the beams are not properly converged, the colored lines constituting components of the bars are discernible and appear in spaced relation to one another.

The adjustment of the dynamic beam convergence circuits of FIGURE 7 may be made by observing the following sequence of operations, after first having achieved static convergence of the three electron beams at the center of the luminescent screen by suitable adjustment of the static convergence means including the permanent magnets 34R, 34G and 34B by means of the knobs 25R, 25G and 25B shown in FIGURE 2. Preferably, the vertical deflection frequency convergence circuit adjustments should be made first in the following order with a cross-hatch pattern of vertical and horizontal bars displayed on the luminescent screen.

(1) Adjust potentiometer 78 to superimpose the green and red vertical lines at the bottom of the center vertical bar.

(2) Adjust potentiometer 82 to superimpose the green and red vertical lines at the top of the center vertical bar.

(3) Alternate Steps 1 and 2, if necessary, to achieve equal convergence of the green and red vertical lines of the center vertical bar from top to bottom of the screen.

(4) Adjust potentiometer 79 to superimpose the green and red horizontal lines of the lower horizontal bar.

(5) Adjust potentiometer 83 to superimpose the green and red horizontal lines of the upper horizontal bar.

(6) Alternate Steps 4 and 5, if necessary, to achieve equal convergence of all green and red horizontal lines of the bar pattern from top to bottom of the screen.

(7) Adjust potentiometers 81 and 84 to converge the blue horizontal lines of the bar pattern with the superimposed green and red horizontal lines.

Having suitably achieved dynamic convergence of the beams at vertical deflection frequency, the control devices of the circuits for effecting dynamic beam convergence at horizontal deflection frequency should then be made in the following order with the same cross-hatch pattern displayed on the screen:

(1) Adjust coil 55 to make straight the blue horizontal line at the right center of the screen.

(2) Adjust potentiometer 56 to make straight the blue horizontal line at the left center of the screen.

(3) Adjust coil 64 to superimpose the green and red vertical lines of the vertical bars at the right side of the screen.

(4) Adjust coil 65 to superimpose the green and red horizontal lines of the horizontal bars at the right side of the screen.

(5) Readjust coil 55, if necessary, to superimpose the blue horizontal line at the right center of the screen with the converged red and green horizontal lines of the center horizontal bar.

(6) Adjust potentiometer 58 to superimpose the green and red vertical lines of the vertical bars at the left side of the screen.

(7) Adjust potentiometer 59 to superimpose the green and red horizontal lines of the horizontal bars at the left side of the screen.

What is claimed is:

1. Beam convergence apparatus for a cathode ray tube comprising:

an insulating plate having an aperture for receiving the neck of said cathode ray tube;

a plurality of electromagnets mounted around said aperture on one side of said plate and having resilient supporting means extending through to the other side of said plate to urge said electromagnets into firm contact with the received tube neck, at least some of said supporting means also serving as electrical connectors;

a plurality of circuit components and control elements mounted on said one plate side and having electrical connectors extending through to said other plate side;

means for securing said supporting means to said other plate side; and printed wiring on said other plate side to which said electrical connectors are affixed.

2. Beam convergence apparatus for a cathode ray tube comprising:

an insulating plate having an aperture for receiving the neck of said cathode ray tube;

a plurality of electromagnets mounted around said aperture on one side of said plate and having resilient supporting means extending through to the other side of said plate and urging said electromagnets into firm contact with said received cathode ray tube neck;

at least some of said supporting means also serving as electrical connectors;

a plurality of circuit components and control elements mounted on said one plate side and having electrical connectors extending through to said other plate side;

printed wiring on said other plate side; and means for securing said supporting means to said other plate side; and for affixing said connectors to said printed wiring.

3. Beam convergence apparatus for a cathode ray tube comprising:

an insulating plate having an aperture for receiving the neck of said cathode ray tube;

means including a plurality of electromagnets and circuit controlling elements mounted on one side of said plate and having supporting members and electrical connectors extending through to the other side of said plate at least some of the supporting members for said electromagnets being resilient to urge said electromagnets into firm contact with the received tube neck;

said electromagnets being symmetrically positioned around said aperture;

means for securing said supporting members to said other plate side; and printed wiring on said other plate side to which said electrical connectors are affixed.

4. Beam convergence apparatus for a cathode ray tube comprising:

a substantially rigid insulating disc having an aperture for receiving the neck of said cathode ray tube;

means including a plurality of electromagnets, wave-shaping circuit components, and control elements mounted around said aperture on one side of said disc and having supporting members and electrical connectors extending through to the other side of said disc at least some of the supporting member for said electromagnets being resilient to urge said electromagnets into firm contact with the received tube neck;

means for securing said supporting members to said other disc side; and printed wiring on said other disc side to which said electrical connectors are affixed.

5. In a cathode ray tube beam convergence apparatus including a plurality of electromagnets each having a pair of horizontal deflection frequency coils and a pair of vertical deflection frequency coils wound on a pair of bobbins through which extend the respective long legs of a pair of L-shaped sections of a magnetic core, a mounting for each of said electromagnets comprising:

an insulating plate having an aperture for receiving the neck of said cathode ray tube;

a plurality of resilient members extending outwardly from each of said pair of bobbins, said horizontal coils being electrically connected to at least one of said resilient members and said vertical coils being electrically connected to at least another one of said resilient members, said resilient members extending through said plate and being secured to said plate to urge said electromagnets into firm contact with the received tube neck;

retaining means substantially enveloping the short legs of said L-shaped magnetic core sections, said retaining means having a resilient portion extending through said plate and being secured to said plate; and clip means engaging said core sections and urging the ends of the short legs of said core sections toward one another.

6. In a cathode ray tube beam convergence apparatus including a plurality of electromagnets each having a pair of horizontal deflection frequency coils and a pair of vertical deflection frequency coils wound on a pair of bobbins through which extend the respective long legs of a pair of L-shaped sections of a magnetic core, a mounting for each of said electromagnets comprising:

an insulating disc having an aperture for receiving the neck of said cathode ray tube;

two pairs of resilient members extending outwardly from each of said pair of bobbins, the terminals of said horizontal coils being electrically connected to one pair of said resilient members and the terminals of said vertical coils being electrically connected to the other pair of said resilient members, said resilient members being shaped to extend through said disc and being secured to said disc;

retaining means having portions substantially enveloping the short legs of said L-shaped magnetic core sections, said retaining means having a resilient leg extending through said disc and being secured to said disc; and a clip engaging said retaining means and having means to urge the ends of the short legs of said core sections toward one another, said two pairs of resilient members and the leg of said retaining means serving to resiliently mount said electromagnet so that said convergence apparatus may be slipped over the neck of the cathode ray tube and press the ends of said long core legs into firm contact with said received tube neck.

7. In a cathode ray tube beam convergence apparatus including a plurality of electromagnets each having a pair of horizontal deflection frequency coils and a pair of vertical deflection frequency coils wound on a pair of flanged bobbins through which extend the respective long legs of a pair of L-shaped sections of a magnetic core, a mounting for each of said electromagnets comprising:

a disc having an aperture for receiving the neck of said cathode ray tube;

two pairs of resilient strips attached to and extending outwardly from each of the respective flanges of said pair of bobbins, the terminals of said horizontal coils being electrically connected to one pair of said strips and the terminals of said vertical coils being electrically connected to the other pair of said strips, said strips being shaped to extend through said disc and being secured to said disc;

retaining means having portions substantially enveloping the short legs of said L-shaped magnetic core sections;

said retaining means having a resilient leg extending through said disc and being secured to said disc; and a clip engaging said retaining means and having clamps at the ends thereof to urge the ends of the short legs of said core sections toward one another, said two pairs of strips and the leg of said retaining means serving to resiliently mount said electromagnet so that said convergence apparatus may be slipped over the neck of the cathode ray tube and press the ends of said long core legs into firm contact with said received tube neck.

8. In cathode ray tube beam convergence apparatus including a plurality of electromagnets each having a pair of horizontal deflection frequency coils and a pair of vertical deflection frequency coils wound on a pair of flanged bobbins through which extend the respective long legs of a pair of L-shaped sections of a magnetic core, a mounting for each of said electromagnets comprising:

an insulating disc having an aperture for receiving the neck of said cathode ray tube;

two pairs of resilient strips attached to and extending substantially parallel to said disc outwardly from each of the respective flanges of said pair of bobbins, the terminals of said horizontal coils being electrically connected to one pair of said strips and the terminals of said vertical coils being electrically connected to the other pair of said strips, said strips being shaped to extend substantially at right angles through said disc and being secured to said disc;

retaining means having portions substantially enveloping the short legs of said L-shaped magnetic core sections;

said retaining means having a resilient leg extending substantially at right angles through said disc and being secured to said disc; and a clip slideably engaging said retaining means and having clamps at the ends thereof to engage said core sections and to urge the ends of the short legs thereof toward one another, said two pairs of strips and the extended leg of said retaining means serving to resiliently mount said electromagnet so that said convergence apparatus may be slipped over the neck of the cathode ray tube and press the ends of said long core legs into contact with said tube neck.

References Cited

UNITED STATES PATENTS

| | | | |
|---|---|---|---|
| 2,180,919 | 11/1939 | Pool | 317—101 |
| 2,474,988 | 7/1949 | Sargrove | 178—7.9 |
| 2,897,390 | 7/1959 | Jensen | 313—77 |
| 3,002,120 | 9/1961 | Clay | 178—5.4 |
| 3,179,857 | 4/1965 | Ammerman | 335—210 |

ROBERT K. SCHAEFER, *Primary Examiner.*

D. SMITH, Jr., *Assistant Examiner.*